Figure 1:
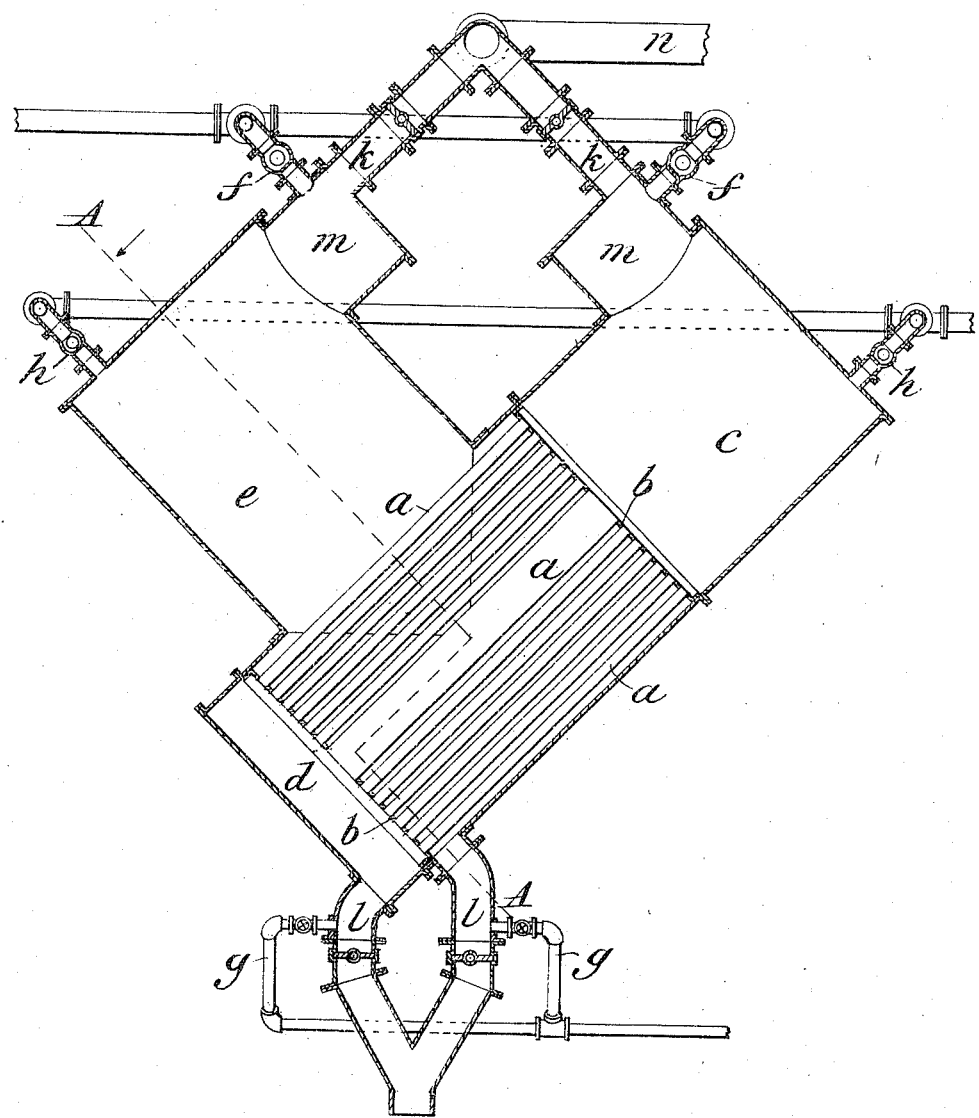

H. FRASCH.
MEANS FOR REMOVING INCRUSTATIONS OF CALCIUM SULFATE FROM BRINE HEATING SURFACES.
APPLICATION FILED NOV. 13, 1899.

1,006,197.

Patented Oct. 17, 1911.

2 SHEETS—SHEET 1.

H. FRASCH.
MEANS FOR REMOVING INCRUSTATIONS OF CALCIUM SULFATE FROM BRINE HEATING SURFACES.
APPLICATION FILED NOV. 13, 1899.
1,006,197.
Patented Oct. 17, 1911.
2 SHEETS—SHEET 2.
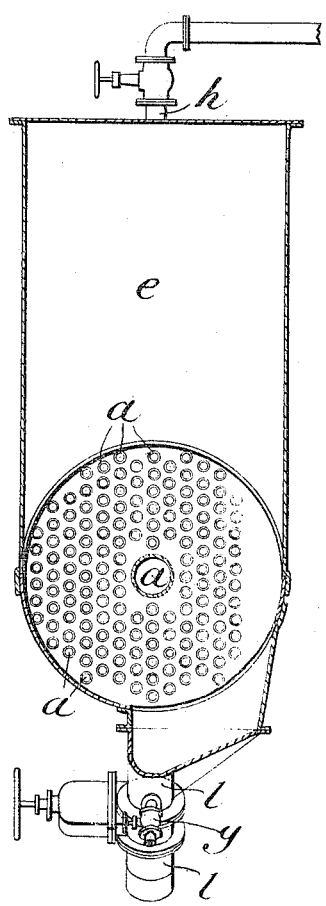
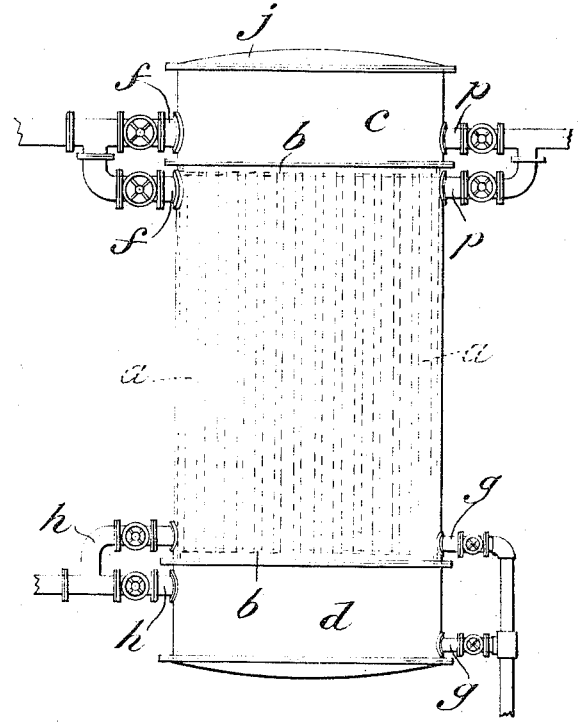

UNITED STATES PATENT OFFICE.

HERMAN FRASCH, OF CLEVELAND, OHIO, ASSIGNOR TO THE UNITED SALT COMPANY, OF CLEVELAND, OHIO, A CORPORATION OF OHIO.

MEANS FOR REMOVING INCRUSTATIONS OF CALCIUM SULFATE FROM BRINE-HEATING SURFACES.

1,006,197.    Specification of Letters Patent.    Patented Oct. 17, 1911.

Application filed November 13, 1899.  Serial No. 736,843.

*To all whom it may concern:*

Be it known that I, HERMAN FRASCH, a citizen of the United States, residing at Cleveland, in the county of Cuyahoga and State of Ohio, have invented certain new and useful Improvements in Means for Removing Incrustations of Calcium Sulfate from Brine-Heating Surfaces; and I do hereby declare the following to be a full, clear, and exact description of the invention.

This invention relates to the removal of the incrustations of calcium sulfate from the heating surfaces of the vessels in which brine or other liquid containing calcium sulfate is heated in order to evaporate the said brine for the recovery of salt therefrom or in order to accomplish some other purpose. This incrustation or scale is very troublesome to the salt maker, as its presence interferes with the transmission of heat to the brine and its removal is hard.

In the evaporation of brine for salt in closed pans (such as vacuum pans for example) it has been customary (in my experience) to draw off the brine twice a day and after filling the pans with water to boil the latter in order to dissolve the common salt in the incrustation and then to scrape the flue walls in order to remove the calcium sulfate. In open pans, it has been the practice to clean the surfaces of the heating pipes once a week by means of hammers. The removal of the incrustation in either of these ways stops the evaporation while it is going on, thus diminishing by so much the output of a given plant, besides being a direct source of expense. The removal by hammering tends moreover to shorten the life of the heating pipes; for even when made extra heavy for the purpose of withstanding the hammering, the repeated blows necessary to remove the coatings are apt in time to split the pipes, so that they leak and have to be replaced.

In addition to the evaporation of brine in pans (open or closed) provided with heating surfaces (usually steam pipes or brine tubes), it has been proposed to heat the brine in one vessel under such pressure or tension of vapor as to prevent evaporation therein and to transfer the so-heated brine to another vessel in which the pressure or tension of vapor is removed to a greater or less extent, and evaporation permitted in consequence; but here too there is apt to be formed a trouble coating of calcium sulfate; for this substance is most soluble in water at about 100° F. (according to authorities the temperature of maximum solubility in water is between 32° C. and 41° C. which correspond respectively with 89$\frac{6}{10}$° F. and 105$\frac{8}{10}$° F.) and is precipitated by the mere heating of brine containing the same. In fact any heating above the very moderate temperature of maximum solubility of calcium sulfate, whether such heating be with or without evaporation, is apt to result in the incrustation of the heating surfaces with a highly objectionable coating of calcium sulfate.

In accordance with the present invention, the incrustation of calcium sulfate is removed from the heating surfaces by condensing steam in contact with so-incrusted surfaces; and as an additional improvement, the condensation is effected, and the heat liberated in such condensation is absorbed, by a body of brine on the opposite side of the heat-conducting walls. The heat liberated by the condensation, therefore, need not be wasted but can be utilized in the heating of the brine with or without vaporizing the same. It is found that the incrustation formed in a given time, can be removed by the condensing steam in an equal (if not in a less) time; the removal of the incrustation consequently need not diminish the output of a given plant; for the brine-heating operation can be carried on with practical continuity; although the brine which is undergoing the heating operation occupies the chambers on opposite sides of the heat-conducting walls alternately. The removal can, moreover, be effected without any direct expense and without injury to the apparatus.

To carry the invention into effect practically, the chambers on opposite sides of the heat-conducting walls are each provided with inlets for respectively the steam to be condensed and the brine to be heated (with or without evaporation) and with means for withdrawing the water of condensation and the product or products of the brine-heating operation (that is the heated brine if there be no evaporation or the water vapor and the heated brine if evaporation take place without bringing the brine to saturation so as to precipitate salt or the water vapor and the precipitated salt if evaporation of saturated brine be carried on). When, however, the heating of brine (with or without evaporation) in only one of the chambers may be desired, it suffices to provide the other chamber with an inlet and outlet for any cooling medium in addition to the steam supply pipe and the outlet for the condensed water, which latter outlet may however, if desired, be the same opening which serves for the withdrawal of the cooling medium.

In the accompanying drawings—Figure 1 is a vertical section of an apparatus in accordance with the invention, for heating brine with evaporation in the brine-holding chamber. Fig. 2 is a section of the same apparatus on line A A of Fig. 1 looking in the direction of the arrow; and Fig. 3 is an elevation of an apparatus, in accordance with the invention, for heating brine without evaporation in the brine-holding chamber.

In both forms of the new or improved brine-heating apparatus, there are two chambers which are separated from each other by the heat-conducting walls, which latter are most advantageously constituted by the walls of suitable pipes. As shown these pipes $a$ extend between perforated tube sheets $b$ after the manner common in tubular condensers, in the heating belts of vacuum pans, in tubular boilers and other like apparatus; and the chambers are formed by the spaces inside and outside of said pipes $a$ respectively. The spaces inside said pipes communicate with one another through the end spaces $c$ and $d$. As shown in Figs. 1 and 2, the chamber outside of the pipes is provided with a dome $e$; and a similar dome could be applied to the corresponding chamber of an apparatus for heating without evaporation. Each of the chambers is provided with (1) a valved pipe $f$ leading from a source of steam supply, as a steam boiler, the exhaust of a steam engine, a pump for receiving and compressing exhaust steam, or other suitable source of steam supply, (2) a valved outlet $g$ for drawing off the water of condensation, (3) a valved conduit $h$ leading from a source of supply of the brine to be heated, and (4) means for withdrawing the one or more products of the heating operation. The pipes $f$ are shown as formed of branches of a common pipe with a valve in each branch; and the valved outlets $g$ for condensed water, as well as the valved conduits $h$ for the brine supply are similarly shown; but any suitable arrangement of pipes, outlets or conduits can be used. As it is immaterial to the present invention what becomes of the water of condensation, it is not essential that there should be a pipe or a conduit of any kind for conveying it away; although it would ordinarily and perhaps always be desirable to use such a pipe or conduit. The conduits for supplying the brine need not be pipes, unless it is desired to introduce the brine under pressure; in other cases troughs would answer. Each chamber has to be closed when it is utilized as the steam-condensing chamber; but it may be open or closed, as may be preferred, when it is utilized as the brine-holding chamber. To remove and to replace a suitable cover (as the top $j$ of the heater of Fig. 3, for example) is one way whereby a chamber can be opened when holding brine and closed when holding steam.

In the apparatus of Figs. 1 and 2, (for heating with evaporation of saturated brine) the means for withdrawing the products of the heating operation consist, for each chamber, of a valved vapor outlet $k$ and a valved salt outlet $l$. As shown the vapor outlets $k$ extend from the small side domes $m$ and are united to a common pipe $n$, for leading away the vapors to any desired point of utilization or discharge. The salt outlets are similarly united. If the evaporation is to take place *in vacuo*, the salt outlets have a long leg or other discharging device, such as is used with ordinary vacuum pans.

In the apparatus of Fig. 3 (for heating without evaporation) the product of the heating operation is simply heated brine and the means for withdrawing it consist of a valved conduit $p$ for each of the chambers. As shown the arrangement of the pipes marked $h$ and $p$ respectively, is such that either pair could be used for introducing the brine to be heated and the other pair for withdrawing the heated brine; and where the heating is without evaporation either pair of conduits could be used either for supply or for discharge.

In operation, brine to be heated, with or without being evaporated as the case may be, is introduced by one of the conduits $h$ into the corresponding chamber, (say for example the chamber composed of the spaces inside of the pipes $a$) and the steam from an appropriate source is introduced by one of the pipes $f$ into the other chamber (to wit, the space surrounding the pipes $a$). The heat of the steam is conducted to the brine through the walls of the pipes $a$, and the steam is at the same time condensed. If the evaporation of the brine is contemplated, the vapor is allowed to escape through the appropriate outlet $k$; and if the brine is, or is allowed to become, saturated, salt is precipitated and accumulates in the salt outlet belonging to the brine-holding chamber; but if the brine is to be heated without evaporation, the heated brine is withdrawn by the appropriate hot brine conduit $p$; and in any case, the supply of brine is renewed continually with brine from the brine supply conduit $h$. The salt (when formed) is removed from time to time, or at each reversal, at one of the outlets $l$. As brine usually holds calcium sulfate in solution, a precipitate of this substance takes place under the action of the heat, or of the heat and vaporization, and forms an incrustation on the heating surfaces of the brine-holding chamber (to wit on the inside of the pipes $a$ in the example above supposed). After any desired interval, with or without waiting for the coating sensibly to impair the conduction of the heat through the walls separating the chambers, the connections are reversed by opening and closing the proper valves, and the steam is introduced into the chamber which has just been emptied of brine and whose walls have become more or less incrusted as aforesaid (to wit in the example supposed the steam is let into the inside of the pipes $a$) and the brine to be heated (with or without evaporation) is introduced into the other chamber (to wit the space outside the pipes $a$) which before was used as the steam space. As before, the steam imparts its heat through the intermediate conducting walls (to wit, of pipes $a$) to the brine of lower temperature on the opposite side of said walls and is condensed. Where evaporation of said brine is to take place, the temperature of its boiling point under the conditions existing in the brine-holding chamber must be below the temperature of steam condensation under the conditions existing in the steam chamber. As the steam condenses in contact with the calcium sulfate incrustation and the water of condensation runs down the same, the calcium sulfate is gradually dissolved and removed, so that the clean metal surfaces are exposed to the steam. In the meanwhile, however, a crust of calcium sulfate has been gradually forming on the brine side (the outside of the pipes $a$ in the example supposed) and continues so to form, until the operator considers it advisable to reverse again the steam and brine supplies. Thus the operation of imparting heat to the brine, with or without evaporating the latter, and with or without the precipitation of salt, may proceed continuously, with the steam and the brine alternately on opposite sides of the heating walls. The water of condensation is withdrawn continuously or at intervals through the appropriate outlet $g$. Any uncondensed steam may escape by the same outlet $g$. In order to empty the chambers (each in its turn) of brine preparatory to the introduction of steam therein, use may be made of the outlets $g$, or of any other suitable openings at the bottom of the respective chambers. Thus an apparatus having salt outlets could have its chambers emptied of brine through them; or if the heated brine be withdrawn from the bottom of the chambers, these can be emptied through the same outlets; or there may be a special brine draw off for emptying either or each of the chambers.

Where evaporation is to take place in a chamber, it is desirable to arrange for the production of a vigorous circulation; and similar dispositions are sometimes wanted where mere elevation of temperature is to be effected. In ordinary vacuum pans, one usual way to accomplish this has been to employ a large pipe in the middle of the heating belt. Such a pipe is shown in Figs. 1 and 2 and furnishes a down flow passage in the chamber formed by the spaces within the pipes; for the chamber surrounding these pipes a down flow passage is formed by omitting some of the pipes as shown in Fig. 2. The large pipe could of course be placed at one side and the down flow passage for the surrounding chamber could be formed through the center or both passages could be eccentric.

When the brine on the opposite side of the heat-conducting walls is in ebullition, the transfer of heat through the conducting walls takes place most rapidly and the condensation of steam is most rapid; and there is a certain fitness therefore, when evaporation is carried on in one chamber, in carrying it on also in the other chamber; but, if desired, evaporation can be carried on in one chamber and heating without evaporation in the other, and the apparatus can be adapted to such working. For example, if the apparatus of Fig. 3 be provided (as is the apparatus of Figs. 1 and 2) with a vapor outlet for the end space $c$ and a salt outlet for the end space $d$, one of the hot brine conduits (to wit the conduit for the chamber formed by the spaces inside the pipes) could be omitted. A similar apparatus would be formed if in the apparatus of Figs. 1 and 2 either of the chambers should be provided with a heated brine outlet, the vapor and salt outlets for this chamber being dispensed with and the inlets and outlets of the other chamber remaining as shown. Other arrangements will suggest themselves. In any such case, the steam would be condensed in contact with the incrustation in one chamber by the transfer of its heat through the walls to the brine on the opposite side of said walls in order (mainly, and it may be simply) to evaporate the water from said brine; while in the other chamber it would be condensed in contact with incrustation on its side of said walls by the transfer of its heat through said walls to the brine on the opposite side in order to raise the sensible temperature of said brine. Should it require a longer time to remove the incrustation left by the evaporation than that formed by simply heating, the simple heating may be carried on for a longer time. This arrangement (to wit a brine-evaporating chamber on one side the heat-conducting walls and a brine chamber for heating without evaporation on the other) may be desirable for adapting most readily the ordinary vacuum pan, or steam closed evaporating pan, for operation in accordance with the present invention, by adding a steam inlet and a condensed water outlet to the ordinary brine-holding chamber and a brine inlet and outlet to the ordinary steam space of the heating belt.

In order to condense the steam in contact with the surfaces incrusted with calcium sulfate, it is essential to have a heat-absorbing medium on the opposite side of the heat-conducting walls; and it is an advantage and special improvement to utilize the brine to be heated (with or without evaporation) as such medium by placing it alternately on the opposite sides of said walls; but if it should be preferred to forego the special advantage of this mode, the heat-absorbing medium can be otherwise constituted and the heat absorbed can be utilized in any desired way. If plain water for example were supplied to the outside of heating pipes whose inside surfaces had been incrusted with calcium sulfate and were exposed to steam, the steam could be condensed in contact with the so-incrusted surfaces in imparting to the water the heat necessary to vaporize the same or to raise its temperature: in such case, the water being free from calcium sulfate, there would be no incrustation on the outside of the pipes; and when the steam should be again admitted to the outside of the pipes, to evaporate or to heat without evaporating the brine inside the same, there would be no incrustation to be removed; so that the incrustation-removing operation could be performed only on the calcium sulfate which is deposited in heating and evaporating brine within the pipes. The hot water or the steam could be utilized as it is customary to utilize such water or steam.

I claim as my invention or discovery:—

1. The process of removing incrustations of calcium sulfate from brine heating surfaces, consisting in bringing steam into contact with the surfaces which have become incrusted with calcium sulfate by the previous conductive heating of brine in contact with said surfaces, and effecting the condensation of said steam in contact with the so incrusted surfaces until the water of condensation shall have dissolved and carried away the calcium sulfate by conductively cooling said surfaces by means of brine of lower temperature on the opposite side of the heat conducting walls, thus utilizing the same body of steam in the double rôle of removing incrustation from one side of said heat conducting walls while it is conductively heating brine on the opposite side thereof, the steam and brine being applied alternately to each side of said heat conducting walls, substantially as described.

2. The process of removing incrustations of calcium sulfate from brine heating surfaces, consisting in bringing steam into contact with the surfaces which have become incrusted with calcium sulfate by the previous conductive heating of brine in contact with said surfaces, and effecting the condensation of said steam in contact with the so incrusted surfaces until the water of condensation shall have dissolved and carried away the calcium sulfate by conductively cooling said surfaces by means of saturated boiling brine of lower temperature on the opposite side of the heat conducting walls, thus utilizing the same body of steam in the double rôle of removing incrustation from one side of said heat conducting walls while it is causing the evaporation of brine and the consequent precipitation of salt on the opposite side of said walls, the steam and brine being applied alternately to each side of said heat conducting walls, substantially as described.

3. An apparatus divided into chambers by heat-conducting walls and provided as to one chamber with a steam supply pipe, a brine supply conduit, and means for withdrawing the products of the steam-condensing and brine-heating operations, and as to the other chamber with a steam supply pipe, means for supplying a cooling medium, and means for withdrawing the products of the steam-condensing and the cooling-medium-heating operations, substantially as described.

4. An apparatus divided into chambers by heat-conducting walls and having each chamber provided with a steam supply pipe, a brine supply conduit, and means for withdrawing the products of the steam-condensing and brine-heating operations, substantially as described.

5. An apparatus divided into chambers by heat-conducting walls and having each chamber provided with a steam-supply pipe, a brine supply conduit, and means for withdrawing water from the steam-condensing operation and water vapor and salt from the brine-heating operation, substantially as described.

In testimony whereof I affix my signature, in presence of two witnesses.

HERMAN FRASCH.

Witnesses:
F. W. LOTHMAN,
J. C. UPDEGROVE.